Oct. 11, 1960  M. M. SCHUSTER  2,955,505
PIN WITH ENLARGED RIB TO PROVIDE PRESTRESSING
Filed Nov. 25, 1957  2 Sheets-Sheet 1

INVENTOR.
MICHAEL M. SCHUSTER
BY
ATTORNEY

Oct. 11, 1960 M. M. SCHUSTER 2,955,505
PIN WITH ENLARGED RIB TO PROVIDE PRESTRESSING
Filed Nov. 25, 1957 2 Sheets-Sheet 2

INVENTOR.
MICHAEL M. SCHUSTER
BY
D. Gordon Angus
ATTORNEY

United States Patent Office 2,955,505
Patented Oct. 11, 1960

2,955,505
PIN WITH ENLARGED RIB TO PROVIDE PRESTRESSING

Michael M. Schuster, Inglewood, Calif., assignor to Hi-Shear Rivet Tool Company, Torrance, Calif., a corporation of California Filed Nov. 25, 1957, Ser. No. 698,672

10 Claims. (Cl. 85—5)

This invention relates to a rivet and to a method for setting the same.

An object of the invention is to provide a two-piece structure which includes a pin and a collar, wherein the pin is stressed in tension during the setting of the rivet so that, even before the rivet is finally set, bodies being joined by it are clamped tightly together. The resulting set fastener clamps the bodies more tightly than a conventional rivet in which the pin is subjected to axially compressive forces during the setting process. The increased tightness results because the pin was stressed in tension during the setting, so that any spring-back tends to shorten the pin and clinch the bodies tightly, rather than to elongate the pin, thereby loosening the grip on the bodies.

A rivet according to this invention comprises a pin having a shank with a manufactured head adjacent one end thereof, and a collar which is to be swaged into circumferential grooves on the unheaded end of the shank to make a unitary rivet structure. The circumferential grooves have a profile in cross section which includes a first shoulder facing away from the head of the pin and an opposed second shoulder facing toward the head of the pin.

A feature of this invention resides in providing the second shoulder of a first of said grooves with a greater crest diameter than the second shoulder of a second of said grooves, which first groove is more remote from the head of the pin than the second groove. The effect of this arrangement is that the shoulder of greater diameter is engaged by the collar as it is swaged onto the pin before the collar engages the smaller shoulder. Then, because the swaging operation places the collar in compressive opposition between one of the bodies being joined and the larger shoulder, and the swaging tool confines the metal of the collar, additional swaging tensilely stresses the pin and keeps it stressed while the collar is finally swaged into all of the grooves.

A preferred, but optional, feature of this invention resides in providing the groove which has the larger crest diameter with a larger diameter in its groove bottom than the diameter of the bottom of the groove which has the smaller crest diameter. In this manner, in addition to being the first groove engaged by the collar, the groove with the larger crest is also the first into which the collar is completely swaged. This feature provides a more reliable pre-stressing action.

Still another preferred, but optional, feature of this invention resides in the provision of a threaded stub at the grooved end of the pin, by means of which a puller can engage the stub and force a swaging tool over the collar from the same side of the work. By this means the rivet can be set by a smooth pull from a hydraulic tool, and can be set by one man, no bucking from the reverse side of the work being required.

The above and other features of this invention will be fully understood from the following detailed description and the accompanying drawings, in which.

Figure 1:
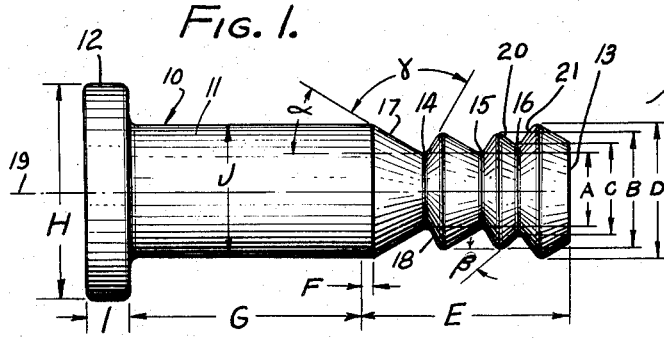
Figure 1 is an elevation of a pin which forms a part of the rivet of this invention.

The preferred embodiment of a pin 10 for use in this invention is shown in Fig. 1. This pin includes a shank 11 which has an enlarged head 12 at one end thereof. At the unheaded end 13 of the shank there is a plurality of circumferential grooves 14, 15, and 16.

Groove 14, which is closer to head 12 than any of the other grooves, has a shoulder 17 which faces away from the head, and a shoulder 18 which faces toward the head. The shoulders are preferably frusto-conical and, in profile cross section as shown, preferably include an angle $\gamma$ of about 90° between them. Shoulder 17 preferably makes an angle $\alpha$ of about 30° with central axis 19 of the pin; that is, an included conical angle of 60°. The dimension designated by A is the diameter of the bottom of groove 14, and the diameter B is the crest diameter of shoulder 18.

Preferably, although not necessarily, there will be more than one groove with the dimensions of groove 14; for example, groove 15 has the dimensions of groove 14. There may be more than two, if desired.

Groove 16 has a shoulder 20 which faces away from the head, and a shoulder 21 which faces toward the head. Shoulder 20 preferably makes a somewhat steeper angle with axis 19 than shoulder 18, angle $\beta$ being 37½°; that is, an included conical angle of 75°. Shoulder 20 and 21 preferably include an angle of about 90°. Both of said shoulders are frusto-conical. The crest diameter of shoulder 20 is equal to the dimension B, because its crest coincides with the crest of groove 15. However, the diameter of the bottom of groove 16, designated by dimension C, is greater than dimension A, dimension A being the diameter of the bottom of a groove closer to the head than groove 16. Dimension D designates the crest diameter of shoulder 21, this dimension being greater than crest diameter B, crest diameter B being the crest of a groove which is closer to the head than groove 16.

Figure 2:
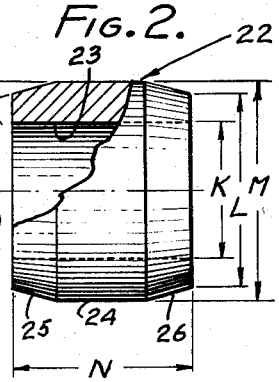
Fig. 2 is an elevation, partly in cut-away cross section, of a collar for use with the pin of Fig. 1.

In Fig. 2 there is shown the preferred embodiment of a collar 22 for use with pin 10. The collar is tubular, having an axial bore 23 which extends from end to end of the collar. The exterior surface of this collar has a central cylindrical section 24 which adjoins a pair of frusto-conical sections 25, 26. Sections 25 and 26 taper to the ends of the collar.

Figure 3:
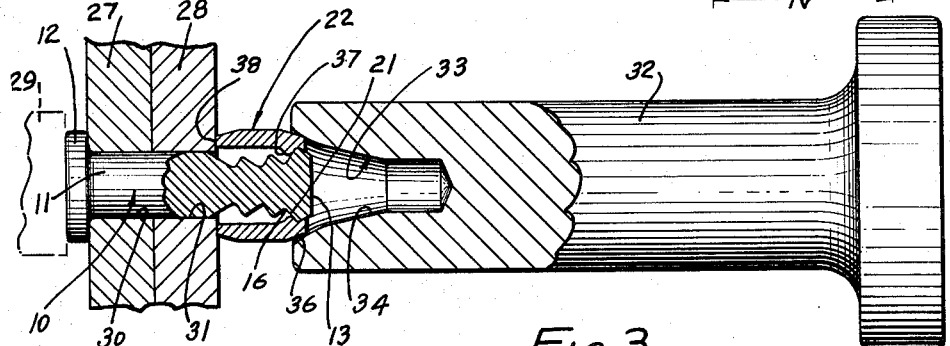
Fig. 3 is an elevation, partly in cut-away cross section, showing the first stage of the setting of a rivet made up of the pin and collar of Figs. 1 and 2.

In Fig. 3 a fastener comprised of pin 10 and collar 22 is shown in the first stage of its being set so as to join workpieces 27 and 28 together. For this purpose a bucking bar 29 is placed against the head 12 of the pin after the shank of the pin is inserted through aligned holes 30, 31 in workpieces 27 and 28, respectively. The collar 22 is placed over the projecting end of the pin, and the anvil 32 of a rivet gun is placed against the collar to force the collar against workpiece 28.

Anvil 32 has a swaging cavity 33 in its end, which cavity has a frusto-conical section 34 and a frusto-toroidal section 36 at its end. The frusto-toroidal section has an arcuate profile in cross section which merges tangentially into the frusto-conical section 35.

When the rivet is set, the anvil 32 is hammered against the collar and the bucking bar is pressed against the head. This causes the wall of swaging cavity 33 to move along the outer surface of the collar, swaging the collar material into the grooves. Fig. 3 illustrates the first stage of the swaging process. As shown, the anvil has moved a short distance along the collar, and has swaged a bead 37 of the collar material into groove 16. This bead 37 on the collar presses against shoulder 21, while the end 38 of the collar presses against workpiece 28. The anvil confines the collar material, and as the anvil is driven along the pin, the collar material can only flow axially and into the grooves. Because the crest of shoulder 21 has the greatest diameter, the collar material engages it first as best shown in Fig. 3, and then the opposition of the collar between the workpiece and shoulder 21 pre-stresses the pin while the collar material is being swaged into the remaining grooves. The pin is thereby placed under axial tension during the setting operation. Therefore, after the setting operation is completed and the setting forces are discontinued, relaxation of the shank results in a clamping force on the workpieces instead of a relaxation as is customarily experienced in connection with the use of compressively-set fasteners.

Figure 4:
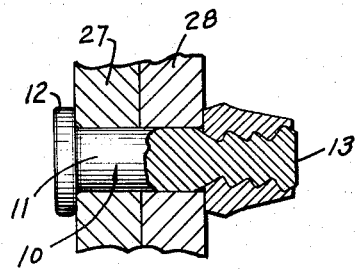
Fig. 4 is an elevation, partly in cut-away cross section, showing the rivet according to the invention in its set condition.

The set fastener shown in Fig. 4 remains under the tensile pre-load given it during the setting operation. Any spring-back only tends to clamp the workpieces more tightly together, because, as contrasted to a rivet which is set by forces which tend to compress the pin portion, wherein spring-back loosens the joint, this rivet is set by tensilely stressing the pin, with the opposite effect.

Figure 5:
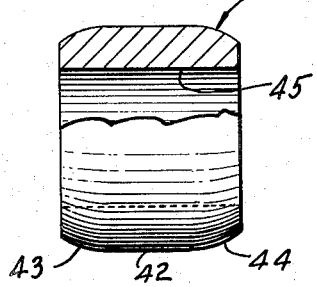
Fig. 5 is an elevation, partly in cut-away cross section, of an optional collar according to the invention.

In Fig. 5 an alternate form of collar 41 is shown. Collar 41 has an outer cylindrical portion 42 and two frusto-toroidal sections 43, 44 at opposite ends of the cylindrical portion, so that the collar periphery tapers down toward the two ends of the collar. A smooth bore 45 passes through the collar from end to end. This configuration of collar may occasionally be found more desirable for softer collar materials than the collar with the frusto-conical end portions. This collar can be used with any of the pins disclosed herein.

Figure 6:
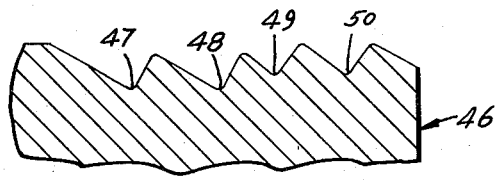
Figs. 6 and 7 are fragmentary cross sectional views showing the profiles of alternate embodiments of pin groove suitable for use in this invention.

Fig. 6 illustrates a condition wherein more than one groove of larger crest diameter and larger bottom diameter may be provided. A portion of a pin 46 is shown in which a pair of grooves 47, 48 have dimensions which are the same as those of grooves 14 and 15, while a pair of grooves 49, 50 are shown farther from the head than grooves 47 and 48, both of which grooves 49, 50 have the dimensions of groove 16. Such an arrangement provides a more positive engagement between the collar and the pin in the initial stage of setting the rivet. It also provides for a greater grip range for the same pin utilizing a collar of a given length.

Figure 7:
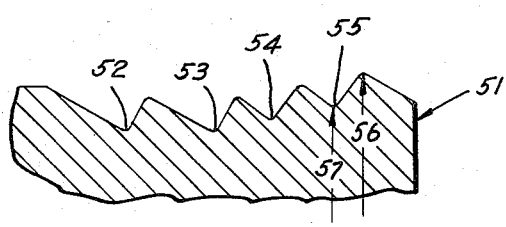

In Fig. 7 there is shown a fragment of a pin 51 in which a pair of grooves 52, 53 are provided which have the same dimensions as grooves 14 and 15. A groove 54 has the dimensions of groove 16, while still another groove 55 has a greater crest diameter 56 and a greater bottom diameter 57 than the corresponding dimensions of groove 54. With such an arrangement, grooves 55 and 54 will be successively engaged in that order by the collar as it is swaged on. The pins of Figs. 6 and 7 can be used with either of the collars of Figs. 2 and 3.

Figure 8:
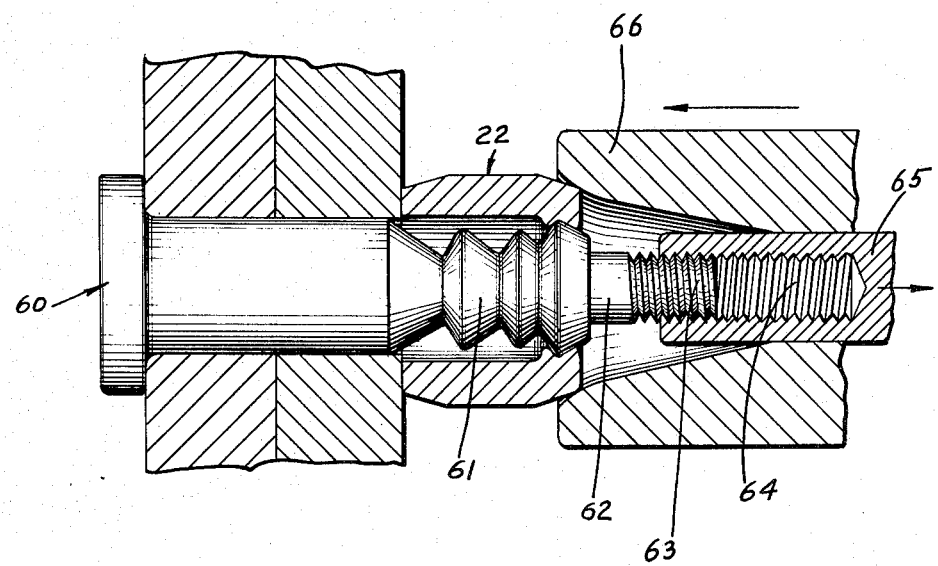
Fig. 8 is an elevation, partly in cross section, of an alternate embodiment of the rivet, along with means for setting said rivet by an alternate method.

Dimensions for a suitable pin and collar according to this invention for a 3/16" rivet are as follows:

$\alpha = 30°; \beta = 37\frac{1}{2}°; \gamma = 90°$ $A = \{.1330, .1290\}$
$B = \{.1730, .1690\}$
$C = \{.1410, .1370\}$
$D = \{.1890, .1850\}$
$E = .205$
$F = .007$
$G = $ to suit thickness of material
$H = \{.315, .295\}$
$I = \{.055, .045\}$
$J = \{.1904, .1893\}$ Collar for 3/16" diameter rivet $K = \{.1930, .1895\}$
$L = \{.290, .280\}$
$M = \{.325, .315\}$
$N = \{.220, .210\}$
$\mu = 15°$ In Fig. 8 there is shown a modified rivet 60 comprising a pin 61 which is the same in all details as pin 10, except that it has, in addition, a stud 62 at the grooved end thereof. This stub is preferably an integral continuation of the pin, with threads 63 for engagement by female threads 64 in one element 65 of a puller.

A collar 22, such as shown in Fig. 2, may be placed over the grooves of the pin and be set therein by a swaging tool 66 which has the same type of swaging cavity as bucking bar 32. Swaging tool 66 may be attached to another element of the said pulling tool, so that elements 65 and 66 are moved in opposition to each other, whereby the head of the pin is pulled against the workpieces and the swaging tool is forced over the collar so as to set the collar in the grooves. When the rivet is set, the pulling tool is disengaged, and the stud is cut away with a pair of nippers.

A convenient form of puller for this purpose is shown in Wing et al. Patent No. 2,789,619 issued April 23, 1957, entitled Fluid Actuated Pulling and Rotating Tool. A particular advantage of the use of this type of tool is that once the rivet is inserted in the holes in the workpiece, it may be set by operations performed on only one side of the workpiece by one person, there being no need for bucking. A steady, measureable force is exerted on the rivet, instead of a hammering force; and there is less chance for damage to the workpiece by tool slippage, or the like.

This invention provides a two-piece rivet which can be set by conventional methods in which an initial clinching force is set up such that, after setting, residual axial stresses in the rivet tend to tighten the workpieces together and not to permit them to loosen. This is a considerable advantage in riveted joints.

While the shoulders of the various grooves have been illustrated as conical frustums, it is to be understood that other configurations, such as rounded or other types of curved shoulders may also be used. Therefore, this invention is not to be limited by the embodiments shown in the drawing and described in the description, which are given by way of example and not of limitation, but only in accordance with the scope of the appended claims.

I claim:

1. A rivet for joining workpieces together by being set in aligned holes in said workpieces, comprising: a pin having a central axis, said pin including a shank, a head on said shank, and a plurality of circumferential grooves in said shank spaced from said head, each of said grooves having a shoulder facing toward said head, the crest of a first shoulder being of greater diameter than the crest of a second shoulder, said first shoulder being the farther removed from the head, said crests and grooves lying normal to the central axis of the pin; and a collar having an axis and an axial circularly cylindrical hole therethrough with a diameter of such size that all of the grooved portion of said shank can be placed in said hole, the spacing between the collar and the second shoulder being substantially greater than the spacing between the collar and the first shoulder, whereby, when the collar is swaged onto the pin, the first shoulder is the first engaged by the collar, and the resulting opposition of the collar between the first shoulder and the workpiece tensilely stresses said pin while the collar is swaged into the remaining grooves on the pin.

2. A rivet according to claim 1 in which said shoulders are frustums of cones.

3. A rivet according to claim 1 in which the collar has an exterior surface which includes a central circular cylindrical portion, and a tapered frusto-conical portion at each end of said cylindrical portion, said frusto-conical portions diminishing in diameter away from said cylindrical portion so that their smaller ends intersect the ends of the collar.

4. A rivet according to claim 1 in which the collar has an exterior surface which includes a central circular cylindrical portion, and a frusto-toroidal portion at each end of said cylindrical portion, said frusto-toridal portions diminishing in diameter away from said cylindrical portions so that their smaller ends intersect the ends of the collar.

5. A rivet according to claim 1 in which a stub is attached to the grooved end of the pin, whereby a puller can be attached to said stub for setting the rivet.

6. A rivet according to claim 5 in which the stub is threaded for attachment to a puller.

7. A rivet according to claim 1 in which each groove is formed by a pair of shoulders, all of said shoulders being frustums of cones.

8. A rivet according to claim 1 in which a stub is attached to the grooved end of the pin, whereby a puller can be attached to said stub for setting the rivet.

9. A rivet according to claim 8 in which said stub is threaded for attachment to a puller.

10. A rivet acccording to claim 1 in which the bottom of the groove having the first shoulder has a greater diameter than the bottom of the groove having the second shoulder.

References Cited in the file of this patent

UNITED STATES PATENTS

| | | |
|---|---|---|
| 192,636 | Collins et al. | July 3, 1877 |
| 2,001,145 | Lambert et al. | May 14, 1935 |
| 2,395,667 | Keller et al. | Feb. 26, 1946 |
| 2,396,661 | Keller | Mar. 19, 1946 |
| 2,531,048 | Huck | Nov. 21, 1950 |
| 2,542,376 | Torresen | Feb. 20, 1951 |
| 2,764,045 | Koenig | Sept. 25, 1956 |
| 2,804,798 | Brilmger | Sept. 3, 1957 |